Jan. 2, 1940.                G. W. LEWIS                2,185,794
                    AUTOMATIC LIFT FOR TRACTOR BUCK RAKES
                         Filed Feb. 1, 1939          2 Sheets-Sheet 2

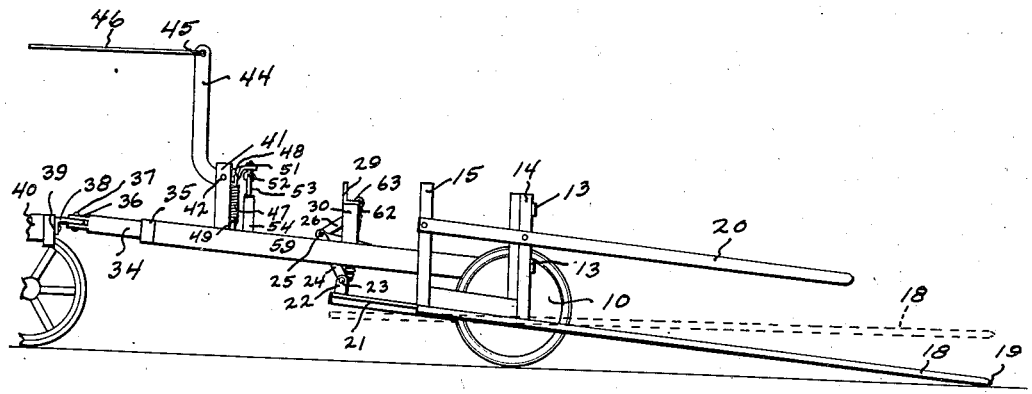

INVENTOR
George W. Lewis
BY
Sam J. Slotsky
ATTORNEY

Patented Jan. 2, 1940

2,185,794

UNITED STATES PATENT OFFICE 2,185,794

AUTOMATIC LIFT FOR TRACTOR BUCK RAKES

George W. Lewis, Early, Iowa, assignor of one-half to John W. Rutledge, and one-half to Emma M. Lewis, both of Early, Iowa Application February 1, 1939, Serial No. 254,036

6 Claims. (Cl. 56—27)

My invention relates to buck rakes.

An object of my invention is to provide a buck rake which can be controlled from the front end of a tractor.

A further object of my invention is to provide a buck rake which includes means for tipping the buck rake so that the forward points of the rake will pass beneath hay or such material on the ground and then to provide a mechanism cooperant therewith to automatically raise the same as the tractor, to which the rake is attached, moves forwardly.

A further object of my invention is to provide easy controlling means cooperant with the above mentioned mechanism to release or lock the buck rake in certain positions.

A further object of my invention is to provide a structure of this character which allows easy operation of the device with a minimum amount of effort, etc.

Figure 3:
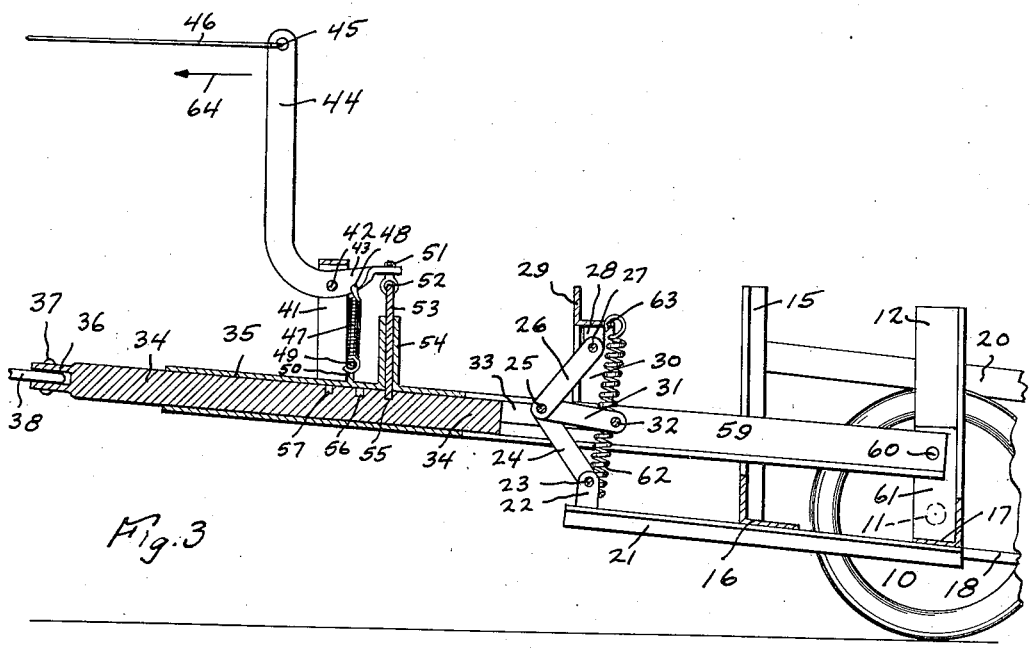
Figure 4:
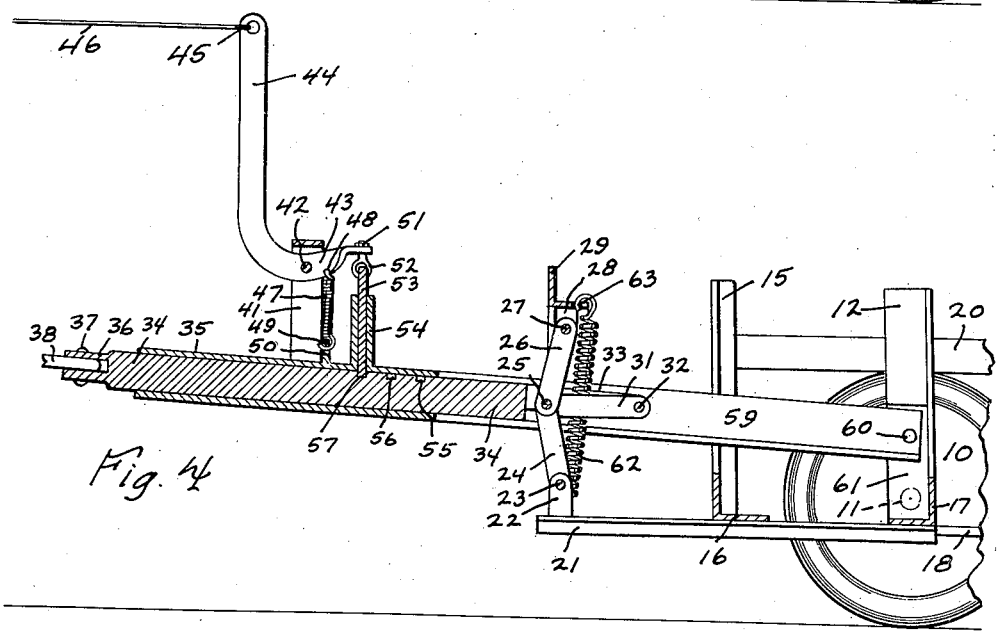

A further object of my invention is to provide the above mentioned objects in a simple construction. With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of the buck rake attached to the front end of a tractor, Figure 2 is a plan view of the same, Figure 3 is a sectional view taken along the lines 3—3 of Figure 2 showing the rake in the lower position, and Figure 4 is a forward view similar to Figure 3 showing the rake in the elevated position.

I have used the character 10 to designate a pair of wheels of any suitable construction which carry the buck rake. The wheels 10 are journalled at 11 (see Figure 3) within suitable bearing members 12 which members include suitable means for stradding the wheels. Attached to the members 12 are the transverse members 13 which terminate in the vertical side members 14. Further side members 15 are provided as shown which are braced by means of the angle transverse member 16 at the rear of the buck rake.

A further transverse angle member 17 is attached transversely across the rake and to the members 12. Equally spaced across the members 16 and 17 are the extended tines 18 of the rake which extend forwardly to the usual points 19, and a pair of forwardly extending side members 20 are also provided as in usual practise.

Rigidly attached to the centers of the members 16 and 17 is the rearwardly extending beam 21 to which is attached the ear 22. Suitably pivoted at 23 to the ear 22 is the angularly inclined link 24 which is pivoted at 25 to a further link 26. The link 26 is pivoted at 27 to the ear 28 which is attached to a further cross member 29 which is attached to the vertical uprights 30.

A further link 31 is pivoted at the common pivot point 25 also and is pivoted at 32 to the forwardly extending side tongues 33 which tongues 33 are attached to a further member 34. The member 34 is preferably square in cross section and is received within a further hollow square member 35. The member 34 which is slidably engaged with the member 35 extends rearwardly into the clevis 36 which includes the pin 37 which in turn allows attachment to the yoke 38 which yoke or such attachment is attached to the bracket 39 of the usual tractor 40. (see Figure 1). A vertically positioned U shaped member 41 is attached to the hollow member 35 and pivoted therein at 42 to the arm portion 43 is an extended vertical lever 44 to which is attached at 45 a control cord 46 which passes rearwardly to the tractor.

A spring 47 is attached at 48 to the arm portion 43 and at 49 to the member 50 which also is attached to the hollow member 35. The end of the arm 43 includes an attachment at 51 which is attached to a loop 52 which loop passes through a locking slide 53 which is slidably engaged with the hollow member 54 which member 54 is attached to the member 35. The member 34 includes a series of recessed slots 55, 56, and 57. Attached at 58 to the hollow member 35 are the diverging arms 59 which extend to the buck rake and which are pivoted at 60 to the vertical members 61 which members 61 are securely attached to the cross members 17 (see Figures 2, 3, and 4). Attached adjacent to the ear 22 and to the beam 21 is the spring 62 which extends upwardly and is attached at 63 to the cross beam 29.

Now that the structure of my device has been explained, I shall explain the operation thereof.

To bring the points 19 of the buck rake to the ground, the control line 46 from the tractor is pulled in the direction of the arrow 64 thereby raising the lower end of the slide 53 out of the slot 57 assuming that the rake is in the horizontal position. The tractor is then backed slightly and the reverse action of the same acting against the weight of the buck rake will cause the member 34 to be carried rearwardly and at the same time drawing the tongues rearwardly which in turn carries the further link 31 rearwardly. Since the link 31 is pivoted at 25 to the links 24 and 26, the tendency will be for the links 24 and 26 to collapse toward each other which in turn raises the rear end of the beam 21 which causes the effect of the points being forced to the ground as shown more clearly in Figure 1 and also in Figure 3. After this operation the control line 46 is released which causes the handle 44 to spring back to normal position by virtue of the spring 47 and the slide will then be engaged in the slot 55 (see Figure 3).

The rake is now locked in the lower position and the tractor is driven forwardly to the hay and the tines 18 will be driven under the hay.

The next operation is to elevate the tines 18 and this again is performed by pulling the control line 46 which releases the slide 53 from the slot 55. The tractor is then started forwardly with the load on the rake. At the instant of forward motion since the rake is at rest, the relative impact caused by the weight on the rake as well as the rake itself will cause the member 34 to be thrust forwardly as shown in Figure 4, since the arm 44 is released. This then, causes the tongues 33 to be carried forwardly which in turn causes the link 31 to be also thrust ahead and the links 24 and 26 to spread farther apart as shown in Figure 4 which causes the rear end of the beam 21 to be forced downwardly causing a pivoting action of the rake upon the wheel bearings 11 and correspondingly the tines of the rake are elevated to the position as shown by the dotted structure shown in Figure 1.

As soon as the rake is raised, the control 46 is released and the lower end of the slide 53 will be drawn into the slot 57 thereby locking the arrangement and the tractor can be driven forwardly to any position and steered through the pivotal arrangement of the pin 37. In releasing the hay, the operation as previously explained and as shown in Figure 3 is performed, which again drops the tines downwardly to the ground surface automatically as the tractor is backed so that the operation takes place automatically through the natural operation of the tractor since the hay will be deposited through a natural withdrawing action of the tractor itself.

The slot 56 provides an intermediate portion between the complete raised position of the tines and the lower position for any purpose such as stacking and the like when it is desired to penetrate into a lower stack or to withdraw from the same or for other similar reasons.

By virtue of the foregoing arrangement, the buck rake can be manipulated from the tractor and steered due to the pivotal attachment at the forward end of the same. This rake will provide all the functions of gathering and depositing hay with only the simple operations explained being necessary.

It will now be seen that I have provided a buck rake which can be controlled from the front end of a tractor, that I have provided means for tipping or raising the buck rake as desired, which means are automatically cooperant with the forward or rearward movement of the tractor. It will also be seen that I have provided means for locking the rake in selected positions, and that I have provided a structure which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including forwardly extending tongues attached to said inner member, a collapsible link structure attached to said tongues, said link structure including an upper and lower link, said upper link being pivotally attached to the rearwardly extending frame and said lower link being pivotally attached to the rake frame, said upper and lower links being pivotally attached at their ends, means for tilting said rake frame by movement of said tongues forwardly or rearwardly to cause corresponding collapsion or separation of said upper and lower links.

2. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including forwardly extending tongues attached to said inner member, a collapsible link structure attached to said tongues, said link structure including an upper and lower link, said upper link being pivotally attached to the rearwardly extending frame and said lower link being pivotally attached to the rake frame, said upper and lower links being pivotally attached at their ends, means for tilting said rake frame by movement of said tongues forwardly or rearwardly to cause corresponding collapsion or separation of said upper and lower links, means for locking said inner member with respect to said receiving member.

3. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including forwardly extending tongues attached to said inner member a collapsible link structure attached to said tongues, said link structure including an upper and lower link, said upper link being pivotally attached to the rearwardly extending frame and said lower link being pivotally attached to the rake frame, said upper and lower links being pivotally attached at their ends, means for tilting said rake frame by movement of said tongues forwardly or rearwardly to cause corresponding collapsion or separation of said upper and lower links, means for locking said inner member with respect to said receiving member, including a plurality of slots corresponding to lowered, raised, or intermediate positions of the rake, means cooperant with said slots for locking purposes.

4. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including forwardly extending tongues attached to said inner member a collapsible link structure attached to said tongues, said link structure including an upper and lower link, said upper link being pivotally attached to the rearwardly extending frame and said lower link being pivotally attached to the rake frame, said upper and lower links being pivotally attached at their ends, means for tilting said rake frame by movement of said tongues forwardly or rearwardly to cause corresponding collapsion or separation of said upper and lower links, means for locking said inner member with respect to said receiving member, including a plurality of slots corresponding to lowered, raised, or intermediate positions of the rake, means cooperant with said slots for locking purposes, including a vertically arranged tongue member adapted to be received within said slots, means for controlling said tongue member from the tractor.

5. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including forwardly extending tongues attached to said inner member a collapsible link structure attached to said tongues, said link structure including an upper and lower link, said upper link being pivotally attached to the rearwardly extending frame and said lower link being pivotally attached to the rake frame, said upper and lower links being pivotally attached at their ends, means for tilting said rake frame by movement of said tongues forwardly or rearwardly to cause corresponding collapsion or separation of said upper and lower links, means for locking said inner member with respect to said receiving member, including a plurality of slots corresponding to lowered, raised, or intermediate positions of the rake, means cooperant with said slots for locking purposes, including a vertically arranged tongue member adapted to be received within said slots, means for controlling said tongue member from the tractor, including a pivoted spring urged lever including a vertical extension, a control line attached to the upper end of said extension passing to said tractor.

6. A buck rake for tractors comprising a rake frame, wheels rotatably journalled thereto, means for tipping the rake frame upon said wheels, said tipping means provided by cooperant action with forward or rearward movement of a tractor connected to said rake frame, said means including a pair of rearwardly extending members pivotally attached to the frame, a hollow rearwardly extending member attached to said members, a further inner member slidably received within said hollow member, means cooperant with said further member to pivot said rake frame, said means including forwardly extending tongues attached to said inner member, a collapsible link structure attached to said tongues, said link structure including an upper and lower link, said upper link being pivotally attached to the rearwardly extending frame and said lower link being pivotally attached to the rake frame, said upper and lower links being pivotally attached at their ends, means for tilting said rake frame by movement of said tongues forwardly or rearwardly to cause corresponding collapsion or separation of said upper and lower links, a rearwardly extending beam attached to said rake frame, said lower link being pivotally attached thereto.

GEORGE W. LEWIS.